US006793240B2

(12) United States Patent
Daines et al.

(10) Patent No.: US 6,793,240 B2
(45) Date of Patent: Sep. 21, 2004

(54) EXPANDABLE SECTION FOR INFLATABLE CURTAINS

(75) Inventors: Michael Daines, Roy, UT (US); Jamie Rawlings, Leamington (CA); Vincent Bennett, Liberty, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 10/206,804

(22) Filed: Jul. 25, 2002

(65) Prior Publication Data

US 2004/0017067 A1 Jan. 29, 2004

(51) Int. Cl.[7] .............................................. B60R 21/24
(52) U.S. Cl. ..................... 280/729; 280/730.2; 280/749
(58) Field of Search ............................ 280/730.2, 729, 280/749

(56) References Cited

U.S. PATENT DOCUMENTS

| | | | | | |
|---|---|---|---|---|---|
| 4,173,356 | A | * | 11/1979 | Ross ........................ | 280/728.2 |
| 5,413,375 | A | * | 5/1995 | Daines et al. ............. | 280/728.2 |
| 5,454,595 | A | * | 10/1995 | Olson et al. .............. | 280/743.1 |
| 5,613,348 | A | * | 3/1997 | Lunt et al. ..................... | 53/429 |
| 5,788,270 | A | | 8/1998 | HÅland et al. .............. | 280/729 |
| 5,853,191 | A | * | 12/1998 | Lachat ...................... | 280/730.2 |
| 5,957,493 | A | * | 9/1999 | Larsen et al. ............. | 280/743.1 |
| 6,073,961 | A | | 6/2000 | Bailey et al. ............. | 280/730.2 |
| 6,106,004 | A | * | 8/2000 | Heinz et al. ................. | 280/729 |
| 6,168,191 | B1 | | 1/2001 | Webber et al. ........... | 280/730.2 |
| 6,210,519 | B1 | * | 4/2001 | Heudorfer et al. .......... | 156/292 |
| 6,254,121 | B1 | * | 7/2001 | Fowler et al. .............. | 280/729 |
| 6,428,037 | B1 | * | 8/2002 | Bakhsh et al. .............. | 280/729 |
| 6,431,587 | B1 | * | 8/2002 | O'Docherty .............. | 280/730.2 |
| 6,431,589 | B1 | * | 8/2002 | Heigl et al. .............. | 280/730.2 |
| 6,431,590 | B1 | * | 8/2002 | Bakhsh et al. ........... | 280/730.2 |
| 6,450,529 | B1 | * | 9/2002 | Kalandek et al. ......... | 280/730.2 |
| 6,457,740 | B1 | * | 10/2002 | Vaidyaraman et al. ... | 280/730.2 |
| 6,494,480 | B2 | * | 12/2002 | Håland et al. .............. | 280/729 |
| 6,508,486 | B1 | * | 1/2003 | Welch et al. ............. | 280/730.2 |
| 6,523,855 | B2 | * | 2/2003 | Musiol et al. .............. | 280/729 |
| 6,554,316 | B2 | * | 4/2003 | Schneider et al. ....... | 280/743.1 |
| 2003/0052477 | A1 | | 3/2003 | Challa et al. | |

FOREIGN PATENT DOCUMENTS

| | | | | |
|---|---|---|---|---|
| GB | 2 327 066 A | 1/1999 | ........... | B60R/21/22 |
| GB | 2 374 053 A | 10/2002 | | |
| WO | WO 99/37507 | 7/1999 | | |
| WO | WO-01/36184 A1 | 5/2001 | | |

* cited by examiner

*Primary Examiner*—Michael J. Carone
*Assistant Examiner*—John Richardson
(74) *Attorney, Agent, or Firm*—Sally J. Brown

(57) ABSTRACT

An inflatable curtain for protecting the occupants of a vehicle during a collision is provided. The inflatable curtain may include an inflatable portion. The inflatable portion may include a plurality of inflation chambers. The inflatable curtain may also include a non-inflatable portion. The non-inflatable portion may include one or more expandable sections disposed between adjacent inflation chambers. Deployment of the inflatable curtain typically causes the inflation chambers to contract in a horizontal direction. Deployment of the inflatable curtain also causes each of the expandable sections to expand horizontally, compensating for the contraction that occurs in the inflation chambers.

21 Claims, 7 Drawing Sheets

United States Patent US 6,793,240 B2

EXPANDABLE SECTION FOR INFLATABLE CURTAINS

BACKGROUND OF THE INVENTION

1. Field of the Invention

The present invention relates to an inflatable curtain designed to protect the occupants of a vehicle during a side impact collision. More specifically, the invention relates to an expandable section in an inflatable curtain that compensates for horizontal contraction of the inflatable curtain during deployment.

2. Description of Related Art

In low-speed automobile collisions, occupants wearing safety belts are generally prevented from impact with the car's interior objects, such as the windshield, instrument panel, or steering wheel. In more severe collisions, however, even belted occupants may impact the car's interior objects because their forward motion is so great that they contact these objects before the belts can bring them to a complete stop.

Vehicle manufacturers and suppliers have developed air bag systems, including side impact air bag systems, to supplement safety belts by reducing the chances of contact with the vehicle's interior objects. In addition, to the extent that such contact cannot be prevented, air bag systems have been designed to distribute the impact more evenly over an occupant's head and torso.

A side impact air bag system typically consists of three parts: an inflatable curtain, an inflator, and a sensor mechanism. The inflatable curtain is typically made of a thin nylon fabric, and may be compacted by accordion folding, rolling, or any other suitable method, and mounted within a housing located in the vehicle over the doors. The inflatable curtain is typically in communication with the inflator, which is typically in communication with the sensor mechanism. A chemical compound and/or compressed gas may be sealed inside the inflator. After impact of sufficient severity, the sensor mechanism detects the sudden deceleration and sends an electrical signal to the inflator. The inflator then produces gas which inflates the inflatable curtain. As an occupant contacts the inflatable curtain, the gas is vented through openings in the sides of the inflatable curtain, thus absorbing the motion of the occupant's impact.

An inflatable curtain typically includes an inflatable portion, which may include one or more inflation chambers. An inflatable curtain typically also includes a non-inflatable portion. Adjacent inflation chambers are typically separated by part of the non-inflatable portion. Deployment of the inflatable curtain typically causes the inflation chambers to contract in a horizontal direction. Contraction of the inflation chambers during deployment may cause the inflation chambers to move out of position, thereby reducing the amount of protection that can be provided to a vehicle occupant during a collision.

One known solution to this problem involves cutting away the non-inflatable portion of the inflatable curtain between adjacent inflation chambers, thereby creating an opening. A connection fabric is then attached to the inflatable curtain inside the opening. The connection fabric has a length that is greater than the length of the opening. This allows the connection fabric to expand during deployment, thereby compensating for the contraction that occurs during deployment. This approach, however, requires that a certain amount of fabric be wasted (i.e., the part of the non-inflatable portion that is cut away), which can be expensive in terms of both material costs and labor. This approach also requires that the connection fabric be slack prior to deployment, which can make it difficult to compact the inflatable curtain in order to store it in the vehicle.

Accordingly, it would be an advancement in the art to provide a way to compensate for contraction that occurs in an inflatable curtain during deployment without requiring that a certain amount of fabric be wasted, and without adding to the complexity involved in storing the inflatable curtain in the vehicle prior to deployment. The present invention provides these advancements in a novel and useful way.

SUMMARY OF THE INVENTION

The apparatus of the present invention has been developed in response to the present state of the art, and in particular, in response to the problems and needs in the art that have not yet been fully solved by currently available inflatable curtains. In accordance with the invention as embodied and broadly described herein, an inflatable curtain for protecting the occupants of a vehicle during a collision is provided.

According to one configuration, the inflatable curtain may include an inflatable portion. The inflatable portion may include a plurality of inflation chambers. The length of each inflation chamber will be referred to herein as a span length. The distance between adjacent inflation chambers will be referred to herein as a separation length. The inflatable portion may also include an inflation inlet for communication with an inflator.

The inflatable curtain may also include a non-inflatable portion. The non-inflatable portion may include one or more expandable sections disposed between adjacent inflation chambers.

Deployment of the inflatable curtain typically causes the inflation chambers to contract in a horizontal direction. Thus, the span length of each inflation chamber typically decreases during deployment. Advantageously, deployment of the inflatable curtain also causes each of the expandable sections to expand horizontally. Thus, the separation length between adjacent inflation chambers increases during deployment, compensating for the contraction that occurs in the inflation chambers. In one embodiment, the expandable sections may be configured so that the total length of the inflatable curtain remains substantially unchanged during deployment.

An expandable section may include a pleat that unfolds during deployment of the inflatable curtain. In one embodiment, an expandable section may include two layers, a first layer and a second layer. The first layer may include a first slit and a first edge adjacent the first slit. Similarly, the second layer may include a second slit and a second edge adjacent the second slit. The pleat may be formed by folding the second layer so that the second edge is aligned with the first edge.

In such an embodiment, a secure fastening mechanism may be provided to fasten the first edge to the second edge. The secure fastening mechanism may cause the first edge to remain fastened to the second edge after deployment of the inflatable curtain. The secure fastening mechanism may take the form of an attachment seam sewn through the first edge and the second edge.

In addition, a severable fastening mechanism may be provided which causes the pleat to remain folded prior to deployment of the inflatable curtain and which allows the pleat to unfold during deployment of the inflatable curtain. The severable fastening mechanism may take the form of a tear seam sewn through the pleat.

These and other features and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the Figures herein, could be arranged and designed in a wide variety of different configurations. Thus, the following more detailed description of the embodiments of the present invention, as represented in FIGS. 1 through 7, is not intended to limit the scope of the invention, as claimed, but is merely representative of presently preferred embodiments of the invention.

Figure 1:
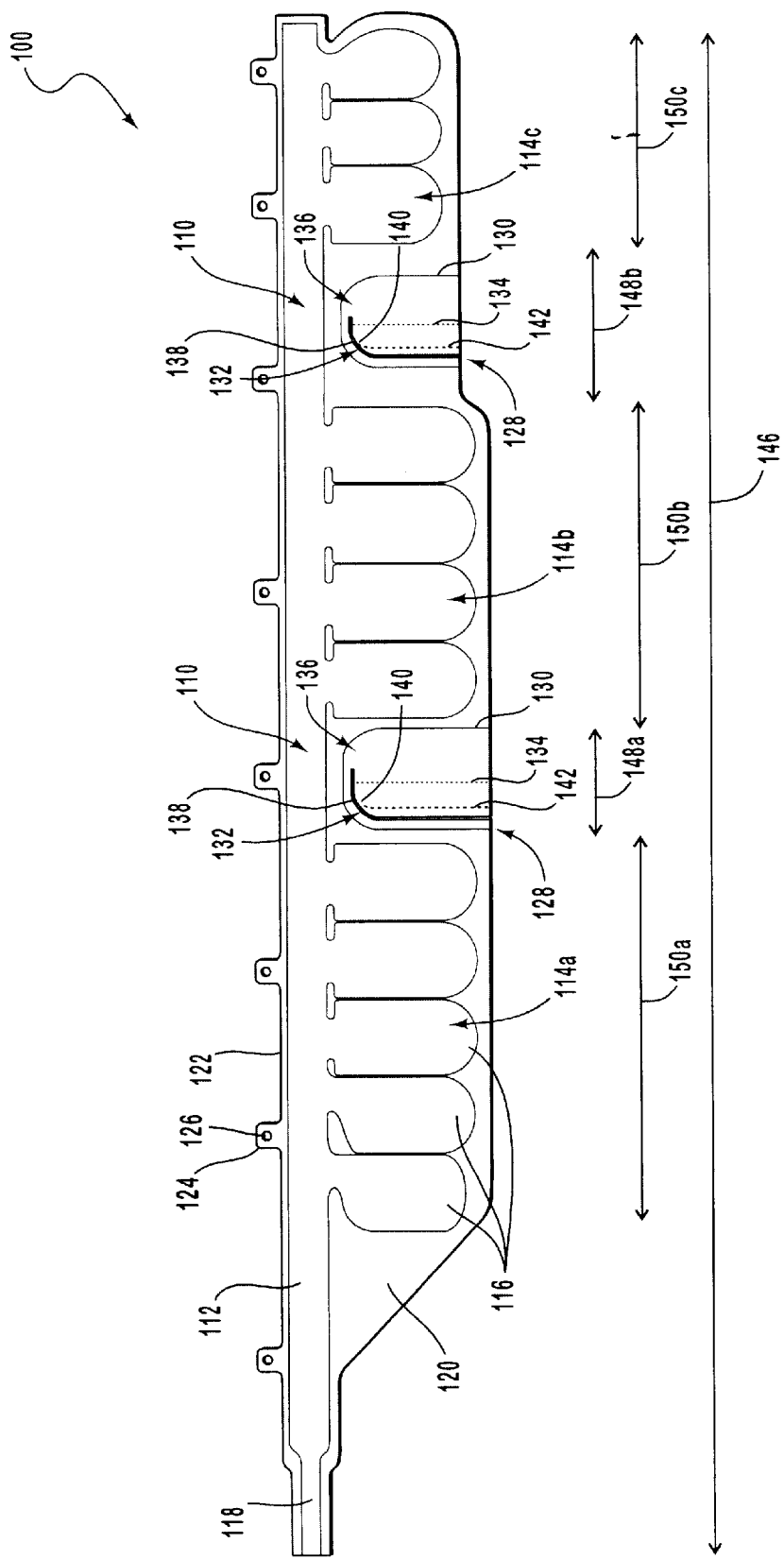
FIG. 1 is a side plan view of an embodiment of an inflatable curtain.

FIG. 1 is a side plan view of an embodiment of an inflatable curtain 100. The inflatable curtain 100 is configured to be mounted within a vehicle over its doors. The inflatable curtain 100 may become deployed during an accident to cover the windows, doors, and lateral surfaces of a vehicle. The front side 110 of the inflatable curtain 100 is shown in FIG. 1.

The inflatable curtain 100 includes an inflatable portion 112. The inflatable portion 112 includes a plurality of inflation chambers 114a–c. Each inflation chamber 114 includes a plurality of inflatable cells 116. The inflatable portion 112 also includes an inflation inlet 118 that is configured to be in communication with an inflator (not shown). The inflator may be of any suitable type or construction for supplying a medium for inflating the inflatable portion 112 of the inflatable curtain 100.

The inflatable curtain 100 also includes a non-inflatable portion 120. The non-inflatable portion 120 is sealed off from the inflatable portion 112 so that inflation of the inflatable portion 112 does not cause the non-inflatable portion 120 to inflate. The non-inflatable portion 120 includes an upper edge 122. A plurality of vertical protrusions 124 extend from the upper edge 122. Each of the vertical protrusions 124 includes an opening 126. The vertical protrusions 124 may be used to attach the inflatable curtain 100 to a vehicle. Specifically, a suitable fastener (e.g., screw, bolt, etc.) may be inserted through the openings 126 and through a portion of a vehicle frame to attach the inflatable curtain 100 to a vehicle.

The non-inflatable portion 120 also includes an expandable section 128 between adjacent inflation chambers 114. In general terms, the expandable sections 128 expand during deployment of the inflatable curtain 100 in order to compensate for contraction that occurs in the inflation chambers 114 as they inflate. A boundary 130 divides each expandable section 128 from the rest of the non-inflatable portion 120. The boundary 130 may be a seam 130.

As shown in FIG. 1, each expandable section 128 includes a pleat 132. A severable fastening mechanism 134 holds the pleat 132 in place prior to deployment of the inflatable curtain 100. As the inflatable curtain 100 deploys, the severable fastening mechanism 134 breaks, causing the pleat 132 to unfold. Unfolding of the pleat 132 allows the expandable section 128 to expand.

The severable fastening mechanism 134 may take the form of a tear seam 134 sewn through the pleat 132. As used herein, a tear seam 134 refers to a seam that is sufficiently strong to hold the pleat 132 in place prior to deployment of the inflatable curtain 100, and that is sufficiently weak to break during deployment of the inflatable curtain 100. Factors that may affect the strength of a seam include the weight of thread used to make the seam, and the stitching frequency (i.e., the number of stitches per unit length). In one embodiment, the tear seam 134 is sewn using T-16 or T-25 thread, and at a stitching frequency of 18–20 stitches per 100 mm of length.

As shown in FIG. 1, each expandable section 128 includes two layers of fabric, a first layer 136 and a second layer (not shown in FIG. 1). The two layers of fabric may be formed from a one-piece weaving technique, in which a single piece of fabric is woven so as to create two distinct layers. Alternatively, the two layers of fabric may be formed from two separate pieces of fabric.

The first layer 136 includes a first slit 138. A first edge 140 is adjacent and interior to the first slit 138. A second slit (not shown in FIG. 1) is cut in the second layer. A second edge (not shown in FIG. 1) is adjacent and interior to the second slit. The first slit 138 and the second slit are used to form the pleat 132. In general terms, this is accomplished by folding the second layer so that the second edge is aligned with the first edge 140. A more detailed explanation of how the first slit 138 and the second slit may be used to form the pleat 132 will be provided below in connection with FIGS. 3–6.

A secure fastening mechanism 142 fastens the first edge 140 to the second edge. The secure fastening mechanism 142 causes the first edge 140 to remain fastened to the second edge after deployment of the inflatable curtain 100. The secure fastening mechanism 142 may take the form of an attachment seam 142 sewn through the first edge 140 and the second edge. As used herein, an attachment seam 142 refers to a seam that is sufficiently strong to remain in place during deployment of the inflatable curtain 100. Typically, a heavier thread is used to sew the attachment seam 142 than the tear seam 134. Also, the attachment seam 142 is typically sewn with a higher stitching frequency than the tear seam 134. In one embodiment, the attachment seam 142 is sewn using 96–132 weight thread, and at a stitching frequency of 30–40 stitches per 100 mm of length.

The inflatable curtain 100 has a total length 146. The total length 146 of the inflatable curtain 100 is influenced by the length of each inflation chamber 114. The length of a single inflation chamber 114 will be referred to herein as a span length 150. There are three inflation chambers 114 shown in FIG. 7: a first inflation chamber 114*a*, a second inflation chamber 114*b*, and a third inflation chamber 114*c*. The first inflation chamber 114*a* has a first span length 150*a*, the second inflation chamber 114*b* has a second span length 150*b*, and the third inflation chamber 114*c* has a third span length 150*c*.

The total length 146 of the inflatable curtain 100 is also influenced by the distance between two adjacent inflation chambers 114, which will be referred to herein as a separation length 148. The first and second inflation chambers 114*a*, 114*b* are separated by a first separation length 148*a*. The second and third inflation chambers 114*b*, 114*c* are separated by a second separation length 148*b*.

Figure 2:
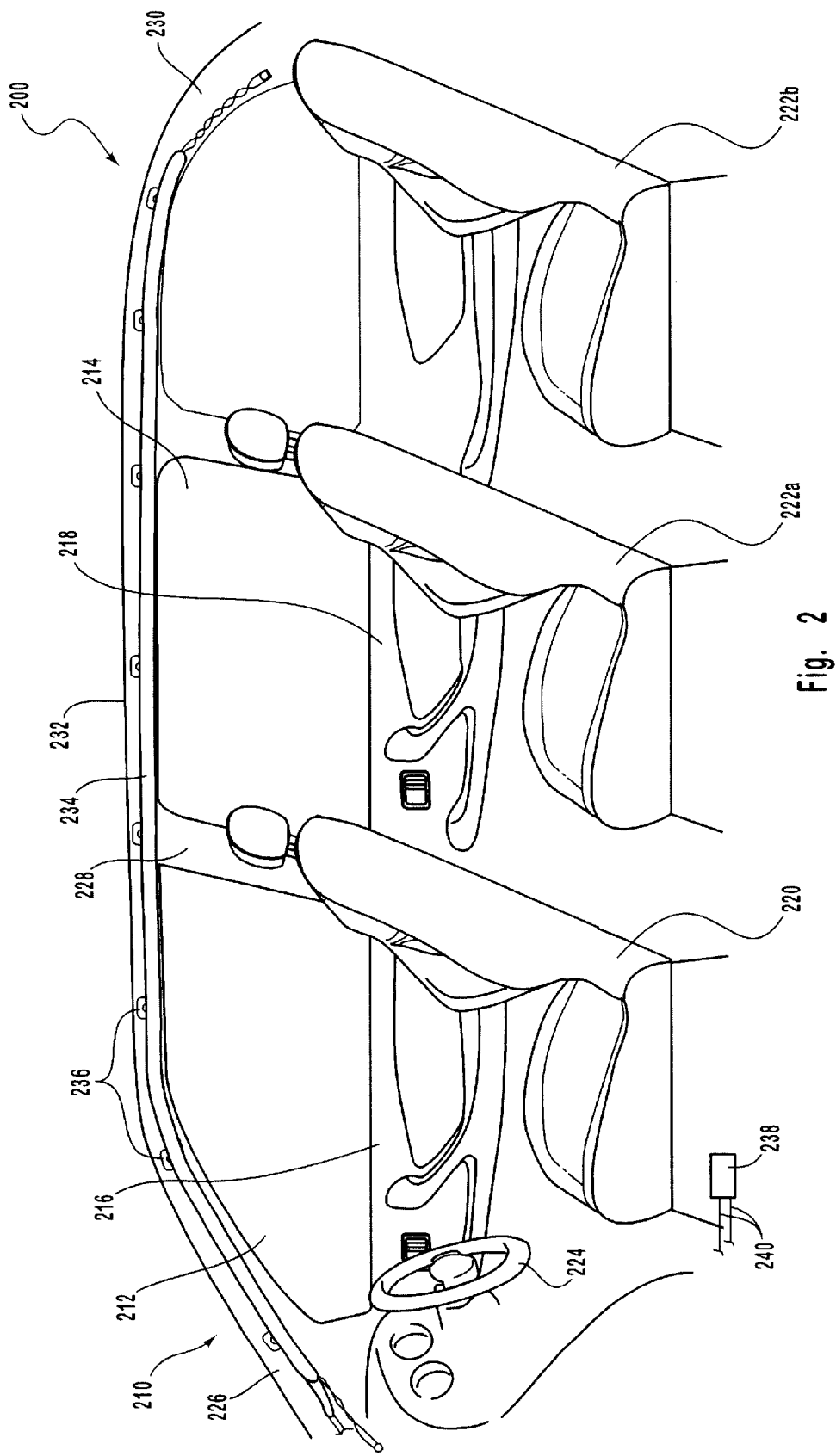
FIG. 2 is a perspective of the inflatable curtain of FIG. 1 installed in a vehicle and shown in its stored position prior to deployment.

FIG. 2 is a perspective view of the inflatable curtain 100 of FIG. 1 installed in a vehicle 200 and shown in its stored position prior to deployment. The vehicle 200 includes a side portion 210, with a front window 212 and a rear window 214 positioned on the side portion 210. A front door 216 is positioned beneath the front window 212, and a rear door 218 is positioned beneath the rear window 214. A front seat 220 is positioned adjacent to the front door 216, and a rear seat 222 is positioned adjacent to the rear door 218. A steering wheel 224 is positioned in front of the front seat 220.

An A-pillar 226 is provided toward the front part of the front door 216. A B-pillar 228 is provided between the front window 212 and the rear window 214. A C-pillar 230 is provided toward the rear part of the rear door 218. A roof 232 is positioned over the top of the vehicle 200.

A housing 234 defines an internal recess that accommodates the inflatable curtain 100 in the vehicle 200 prior to inflation. The housing 234 has a non-linear, elongated configuration, originating at a point on the C-pillar 230 and extending along the roof 232. The inflatable curtain 100 may be compacted by accordion folding, rolling, or any other suitable method and stored in the housing prior to inflation. A plurality of fasteners 236 may be located on the housing 234 and used to secure the housing 234 to the vehicle 200.

The vehicle 200 also includes a sensor mechanism 238, which is adapted to sense a side impact to the vehicle. Lead wires 240 are attached to the sensor mechanism 238. The lead wires 240 provide electrical communication between the sensor mechanism 238 and an inflator (not shown in FIG. 2) which is in communication with the inflatable curtain 100.

FIGS. 3–6 illustrate one way in which the pleat 132 illustrated in FIG. 1 may be formed in an expandable section 128. FIGS. 3–6 are arranged so as to illustrate successive steps in the formation of the pleat 132. Of course, the steps illustrated in FIGS. 3–6 are intended to be illustrative, not restrictive. Those skilled in the art will recognize a variety of different ways in which the pleat 132 may be formed.

Figure 3:
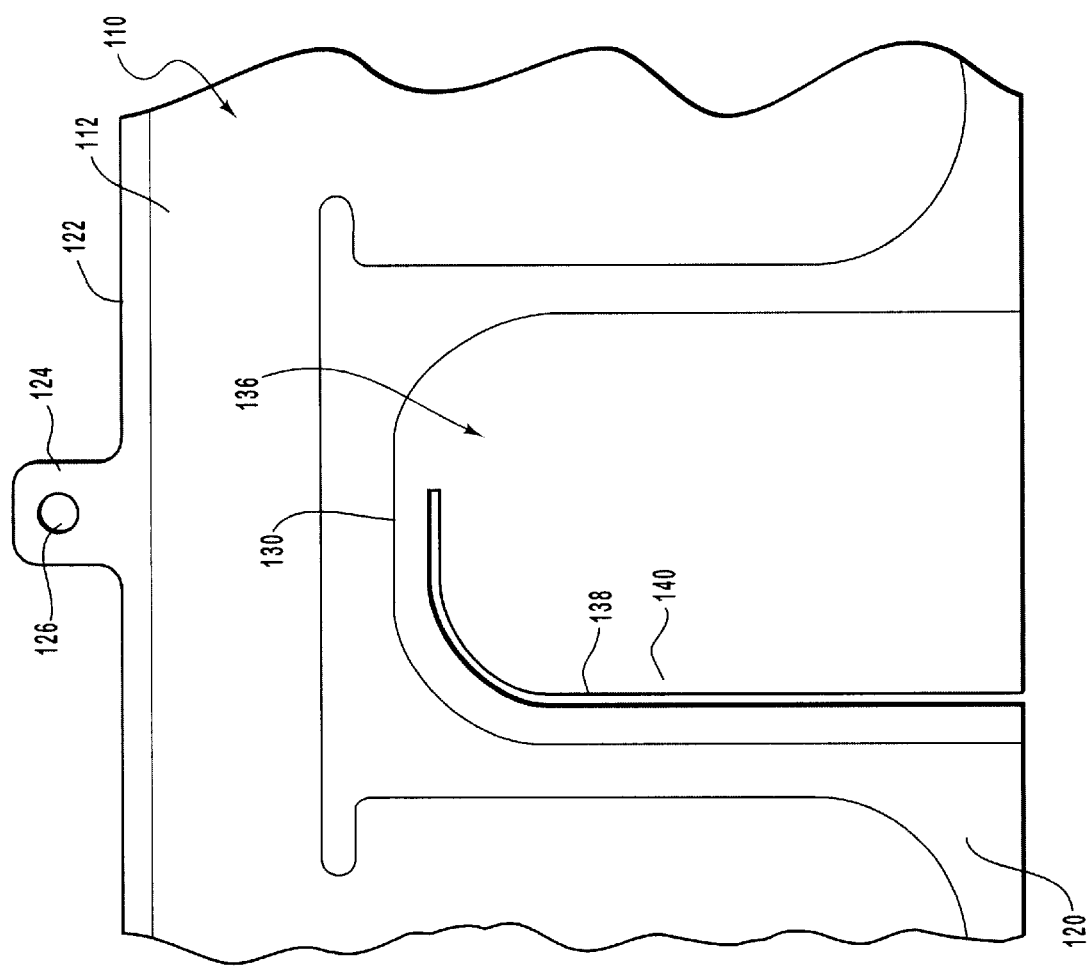
FIG. 3 is a side plan view of an expandable section of the inflatable curtain during formation of a pleat.

FIG. 3 is a side plan view of an expandable section 128 of the inflatable curtain 100 during formation of a pleat 132. Specifically, FIG. 3 illustrates the front side 110 of the inflatable curtain 100 and the first layer 136 of an expandable section 128. As shown in FIG. 3, formation of a pleat 132 may involve cutting a first slit 138 in the first layer 136 of an expandable section 128. As stated previously, a first edge 140 may be located adjacent and interior to the first slit 138.

Figure 4:
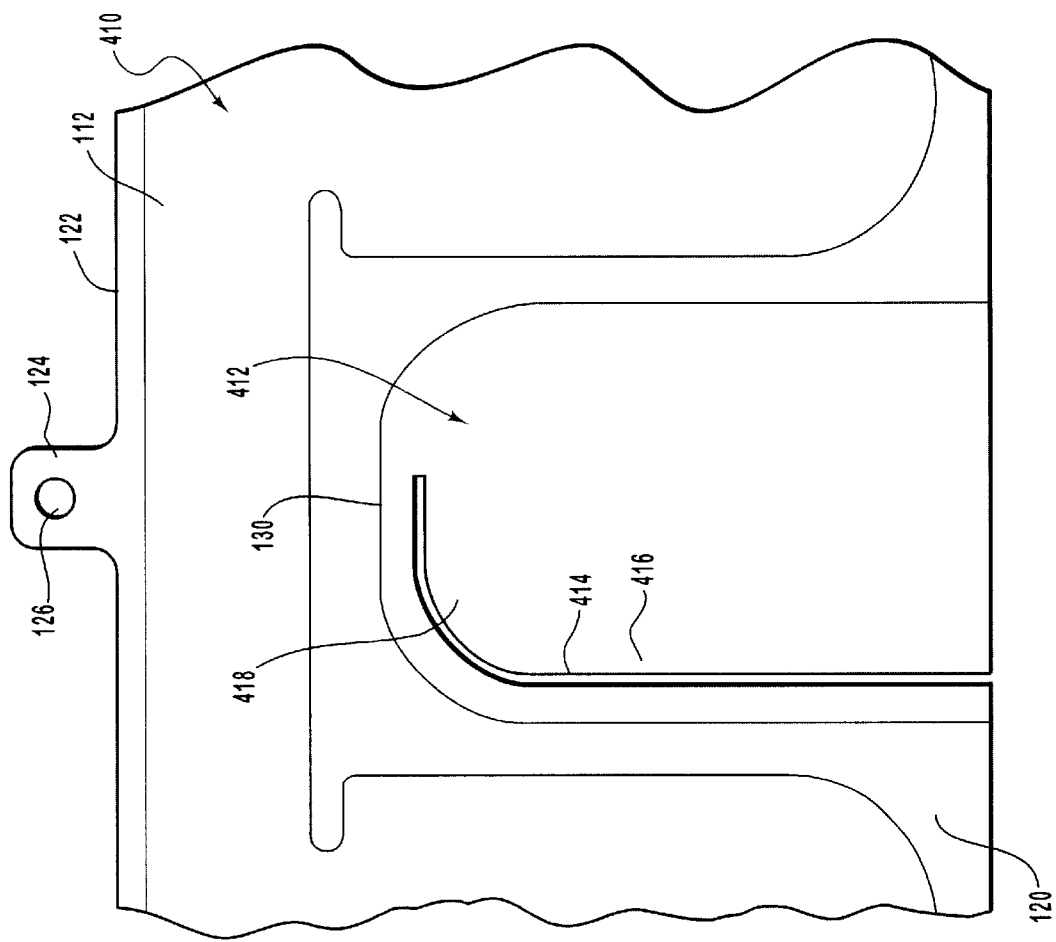
FIG. 4 is a side plan view of an expandable section of the inflatable curtain during formation of a pleat.

FIG. 4 is a side plan view of an expandable section 128 of the inflatable curtain 100 during formation of a pleat 132. Specifically, FIG. 4 illustrates the back side 410 of the inflatable curtain 100 and the second layer 412 of the expandable section 128. As shown in FIG. 4, formation of a pleat 132 may involve cutting a second slit 414 in the second layer 412 of the expandable section 128. A second edge 416 may be located adjacent and interior to the second slit 414. Cutting the second slit 414 causes there to be a flap portion 418 in the second layer 412.

Figure 5:
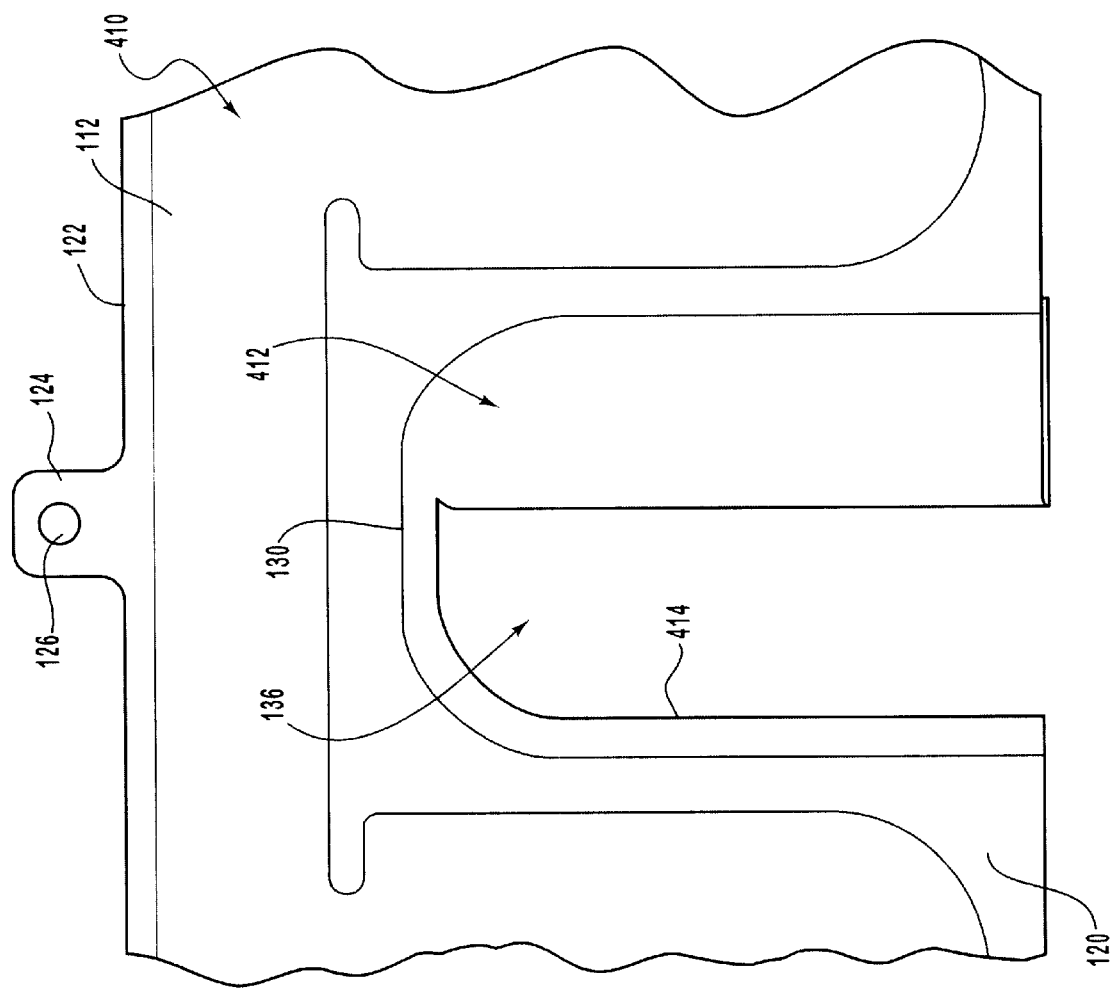
FIG. 5 is a side plan view of an expandable section of the inflatable curtain during formation of a pleat.

FIG. 5 is a side plan view of an expandable section 128 of the inflatable curtain 100 during formation of a pleat 132. Specifically, FIG. 5 illustrates the back side 410 of the inflatable curtain 100 after a second slit 414 has been cut in the second layer 412. As shown in FIG. 5, formation of a pleat 132 may involve folding the flap portion 418 of the second layer 412 so that the second edge 416 is aligned with the first edge 140 of the first layer 136. The flap portion 418 may be folded under the rest of the second layer 412 so that the second edge 416 touches the first edge 140.

Figure 6:
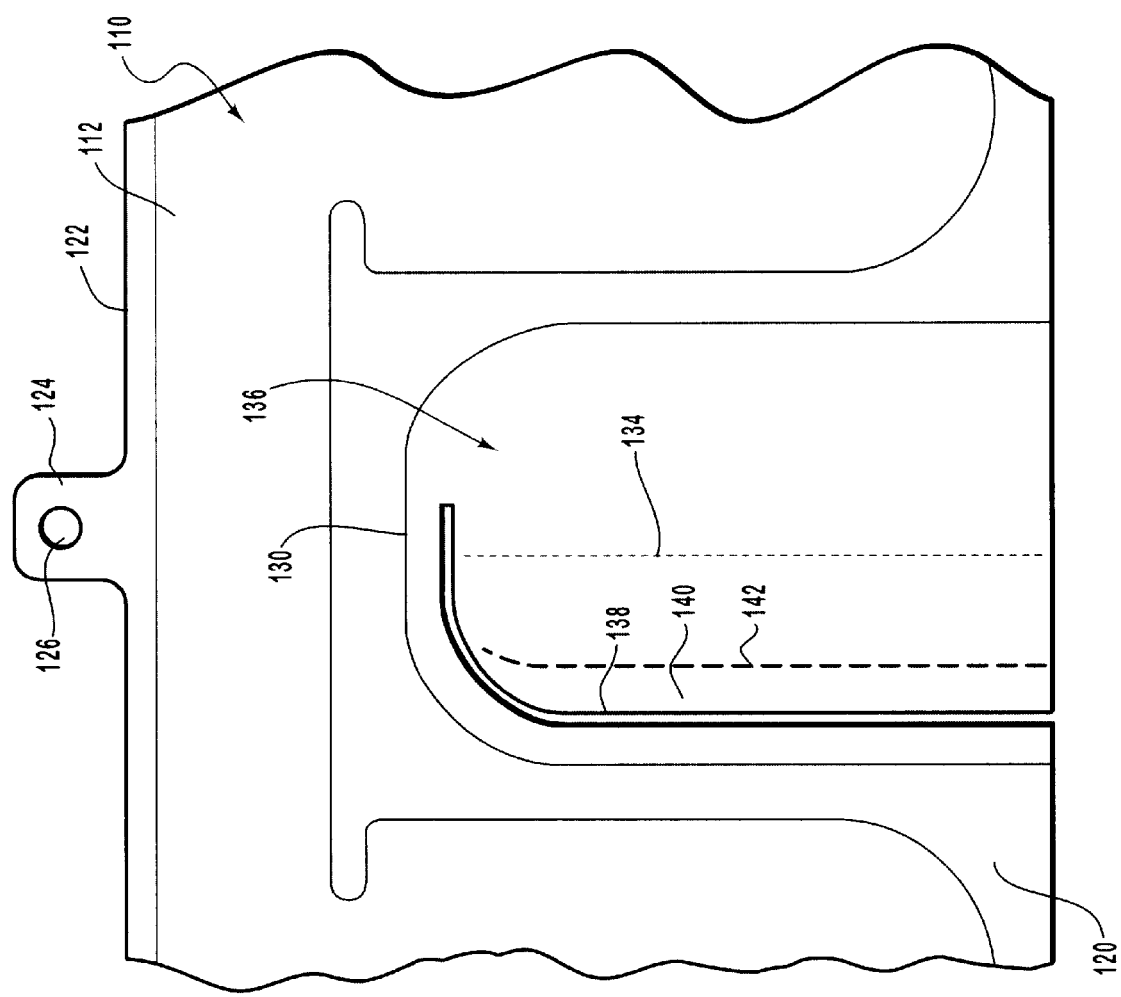
FIG. 6 is a side plan view of an expandable section of the inflatable curtain during formation of a pleat.

FIG. 6 is a side plan view of an expandable section 128 of the inflatable curtain 100 during formation of a pleat 132. Specifically, FIG. 6 illustrates the front side 110 of the inflatable curtain 100 after the flap portion 418 of the second layer 412 has been folded under the rest of the second layer 412. As shown in FIG. 6, formation of a pleat 132 may involve providing a secure fastening mechanism 142 that fastens the first edge 140 to the second edge 416 and that causes the first edge 140 to remain fastened to the second edge 416 after deployment of the inflatable curtain 100. As described previously, the secure fastening mechanism 142 may take the form of an attachment seam 142. Formation of a pleat 132 may also involve providing a severable fastening mechanism 134 that causes the pleat 132 to remain folded prior to deployment of the inflatable curtain 100 but that allows the pleat 132 to unfold during deployment of the inflatable curtain 100. As described previously, the severable fastening mechanism 134 may take the form of a tear seam 134.

Figure 7:
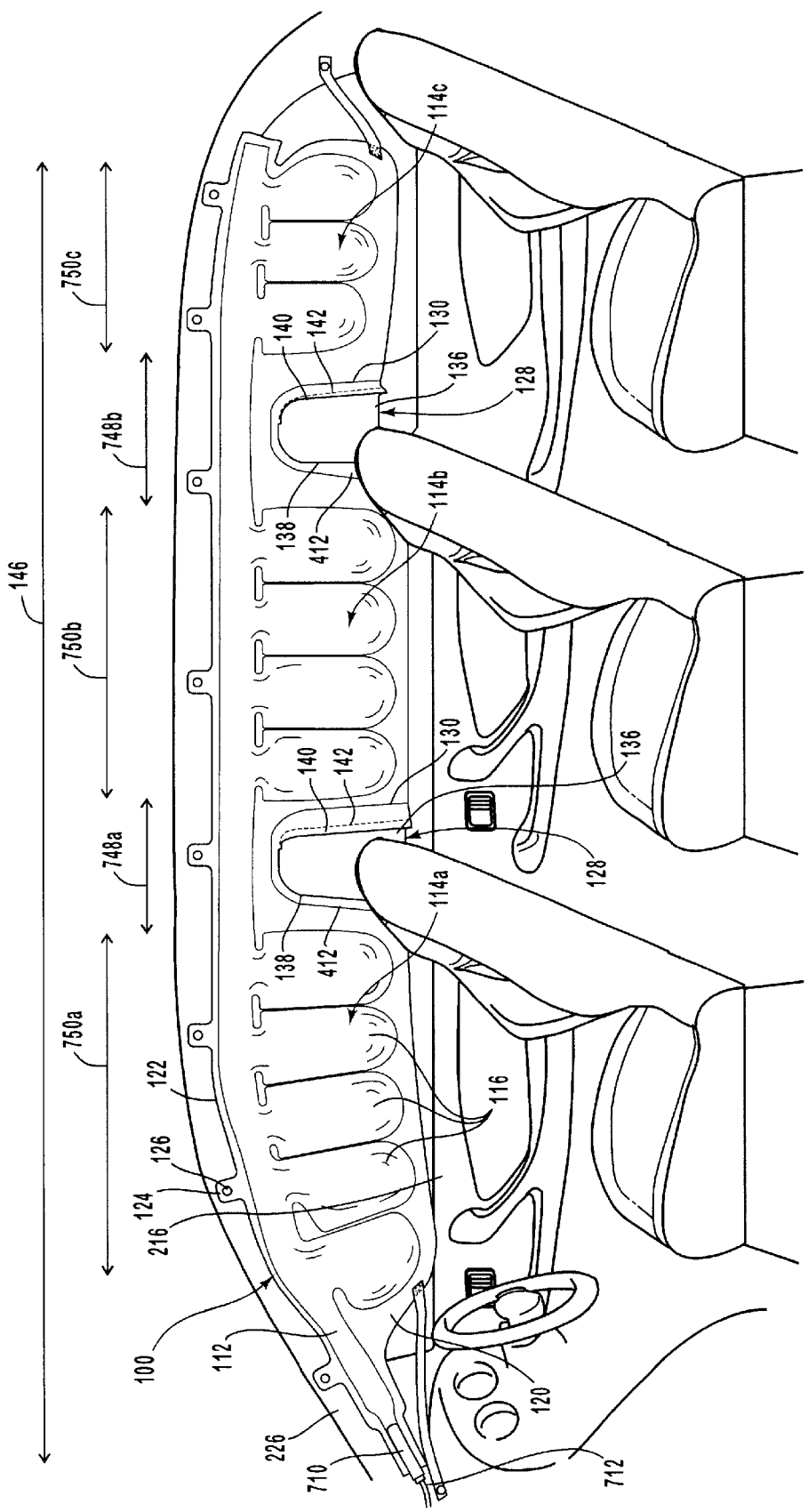
FIG. 7 is a side plan view of the inflatable curtain of FIG. 1 installed in a vehicle and shown after deployment.

FIG. 7 is a side plan view of the inflatable curtain 100 of FIG. 1 installed in a vehicle 200 and shown after deployment. The housing 234 is in an open position, so that the inflatable curtain 100 is not contained within the housing 234. An inflator 710 is shown in communication with the inflation inlet 118. The inflator 710 includes lead wires 712 that are in electronic communication with the lead wires 240 attached to the sensor mechanism 238. The inflator 710 has discharged, and the inflatable curtain 100 is shown in its inflated position, located between the front seat 220 and rear seat 222 and the side portion 210 of the vehicle 200.

Deployment of the inflatable curtain 100 has caused the inflation chambers 114 to contract. That is, the first inflation chamber 114*a* has a span length 750*a* after deployment that is less than its span length 150*a* prior to deployment, the second inflation chamber 114*b* has a span length 750*b* after deployment that is less than its span length 150*b* prior to deployment, and the third inflation chamber 114*c* has a span length 750*c* after deployment that is less than its span length 150*c* prior to deployment.

Deployment of the inflatable curtain 100 has also caused the expandable sections 128 to expand. In the embodiment shown in FIG. 7, deployment of the inflatable curtain 100 has caused the severable fastening mechanisms 134 to break, allowing the pleats 132 to unfold and causing the expandable sections 128 to expand. Expansion of the expandable sections 128 increases the separation length 748 between adjacent inflation chambers 114. That is, the separation length 748a between the first inflation chamber 114a and the second inflation chamber 114b after deployment is greater than the separation length 148a between the first inflation chamber 114a and the second inflation chamber 114b prior to deployment. Similarly, the separation length 748b between the second inflation chamber 114b and the third inflation chamber 114c after deployment is greater than the separation length 148b between the second inflation chamber 114b and the third inflation chamber 114c prior to deployment.

The expandable section 128 may be configured so that the expansion of the expandable sections 128 compensates for the contraction of the inflation chambers 114 during deployment. In this way, the total length 146 of the inflatable curtain 100 may remain substantially unchanged during deployment. In the embodiment shown in FIG. 7, the expansion of the expandable sections 128 is proportional to the size of the pleat 132. Thus, the amount of expansion that occurs in the expandable sections 128 during deployment may be adjusted by adjusting the size of the pleat 132.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by U.S. Letters Patent is:

1. An inflatable curtain for protecting the occupants of a vehicle during a collision, comprising:
   a first inflation chamber;
   a second inflation chamber;
   a non-inflatable portion; and
   an expandable section disposed within the non-inflatable portion between the first inflation chamber and the second inflation chamber, wherein deployment of the inflatable curtain causes the expandable section to expand horizontally.

2. The inflatable curtain of claim 1, wherein the expandable section comprises a pleat that unfolds during deployment of the inflatable curtain.

3. The inflatable curtain of claim 2, wherein the expandable section comprises:
   a first layer comprising a first slit and a first edge adjacent the first slit;
   a second layer comprising a second slit and a second edge adjacent the second slit, wherein the second layer is folded so that the second edge is aligned with the first edge to form the pleat.

4. The inflatable curtain of claim 3, further comprising a secure fastening mechanism that fastens the first edge to the second edge and that causes the first edge to remain fastened to the second edge after deployment of the inflatable curtain.

5. The inflatable curtain of claim 4, wherein the secure fastening mechanism comprises an attachment seam sewn through the first edge and the second edge.

6. The inflatable curtain of claim 2, further comprising a severable fastening mechanism that causes the pleat to remain folded prior to deployment of the inflatable curtain and that allows the pleat to unfold during deployment of the inflatable curtain.

7. The inflatable curtain of claim 6, wherein the severable fastening mechanism comprises a tear seam sewn through the pleat.

8. An inflatable curtain for protecting the occupants of a vehicle during a collision, comprising:
   an inflatable portion comprising a first inflation chamber and a second inflation chamber, the second inflation chamber being separated from the first inflation chamber by a separation length; and
   a non-inflatable portion comprising an expandable section disposed between the first inflation chamber and the second inflation chamber, wherein deployment of the inflatable curtain causes the expandable section to expand horizontally and the separation length to increase.

9. The inflatable curtain of claim 8, wherein the expandable section comprises a pleat that unfolds during deployment of the inflatable curtain.

10. The inflatable curtain of claim 9, wherein the expandable section comprises:
    a first layer comprising a first slit and a first edge adjacent the first slit;
    a second layer comprising a second slit and a second edge adjacent the second slit, wherein the second layer is folded so that the second edge is aligned with the first edge to form the pleat.

11. The inflatable curtain of claim 10, further comprising a secure fastening mechanism that fastens the first edge to the second edge and that causes the first edge to remain fastened to the second edge after deployment of the inflatable curtain.

12. The inflatable curtain of claim 11, wherein the secure fastening mechanism comprises an attachment seam sewn through the first edge and the second edge.

13. The inflatable curtain of claim 9, further comprising a severable fastening mechanism that causes the pleat to remain folded prior to deployment of the inflatable curtain and that allows the pleat to unfold during deployment of the inflatable curtain.

14. The inflatable curtain of claim 13, wherein the severable fastening mechanism comprises a tear seam sewn through the pleat.

15. An inflatable curtain for protecting the occupants of a vehicle during a collision, comprising:
    an inflatable portion comprising:
        a first inflation chamber comprising a first plurality of inflatable cells, the first inflation chamber having a first span length;
        a second inflation chamber comprising a second plurality of inflatable cells, the second inflation chamber having a second span length, the second inflation chamber being separated from the first inflation chamber by a separation length; and
        an inflation inlet for communication with an inflator; and
    a non-inflatable portion comprising an expandable section disposed between the first inflation chamber and the second inflation chamber, wherein deployment of the inflatable curtain causes the first and second inflation chambers to contract horizontally so that the first and second span lengths decrease, and wherein deployment of the inflatable curtain also causes the expandable section to expand horizontally so that the separation length increases, so that the total length of the inflatable curtain remains substantially unchanged during deployment.

16. The inflatable curtain of claim 15, wherein the expandable section comprises a pleat that unfolds during deployment of the inflatable curtain.

17. The inflatable curtain of claim 16, wherein the expandable section comprises:

a first layer comprising a first slit and a first edge adjacent the first slit;

a second layer comprising a second slit and a second edge adjacent the second slit, wherein the second layer is folded so that the second edge is aligned with the first edge to form the pleat.

18. The inflatable curtain of claim 17, further comprising a secure fastening mechanism that fastens the first edge to the second edge and that causes the first edge to remain fastened to the second edge after deployment of the inflatable curtain.

19. The inflatable curtain of claim 18, wherein the secure fastening mechanism comprises an attachment seam sewn through the first edge and the second edge.

20. The inflatable curtain of claim 16, further comprising a severable fastening mechanism that causes the pleat to remain folded prior to deployment of the inflatable curtain and that allows the pleat to unfold during deployment of the inflatable curtain.

21. The inflatable curtain of claim 20, wherein the severable fastening mechanism comprises a tear seam sewn through the pleat.

* * * * *